(No Model.) R. EICKEMEYER. 6 Sheets—Sheet 1.
MACHINE FOR PLANING THE FOLDED OR CURLED EDGES OF HAT BRIMS.
No. 317,324. Patented May 5, 1885.
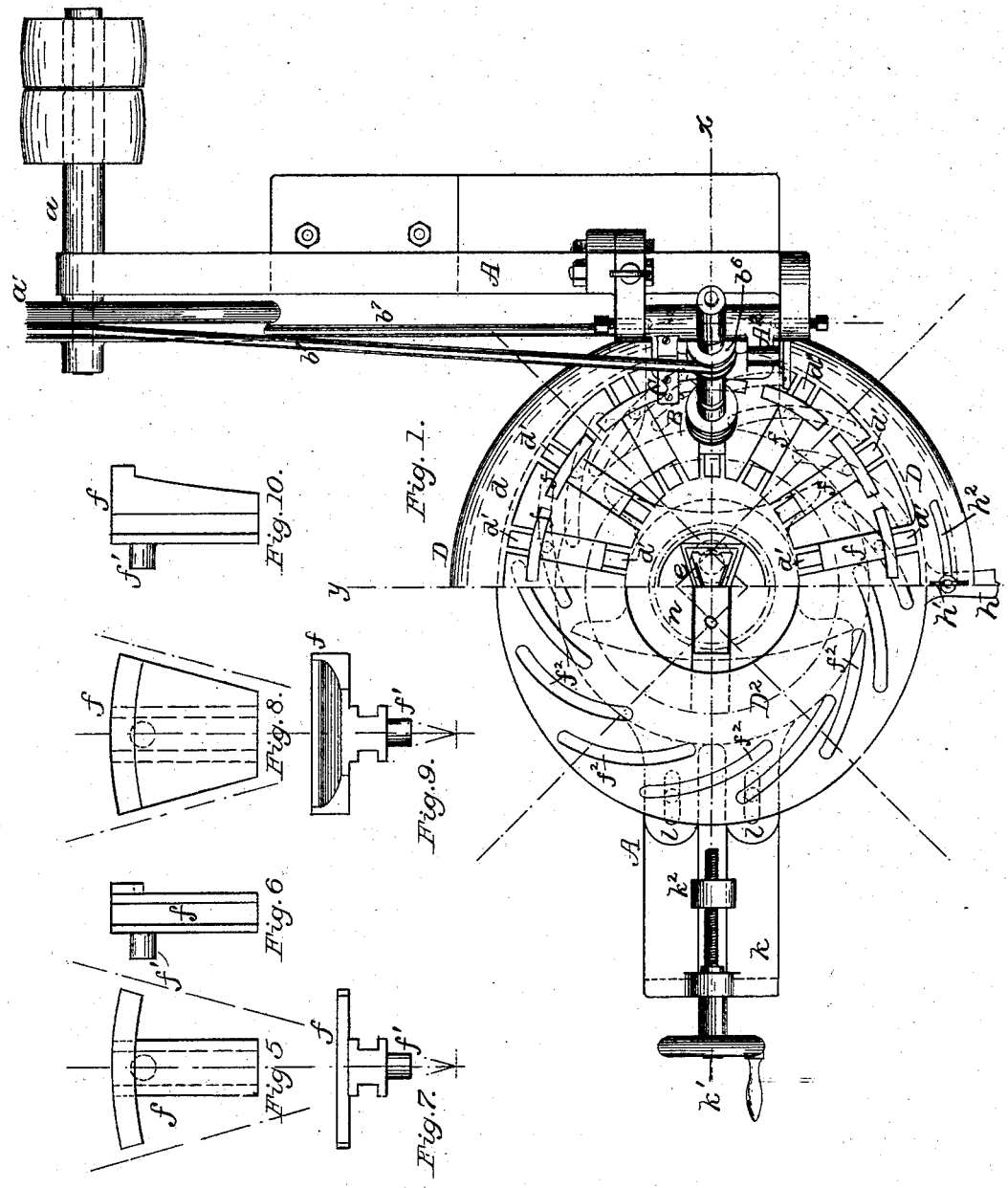
Attest:
Philip F. Larner
Howell Bartle
Inventor:
Rudolf Eickemeyer
By Wm Clifford
Attorney.

(No Model.)  
6 Sheets—Sheet 2.
R. EICKEMEYER.  
MACHINE FOR PLANING THE FOLDED OR CURLED EDGES OF HAT BRIMS.
No. 317,324.  
Patented May 5, 1885.
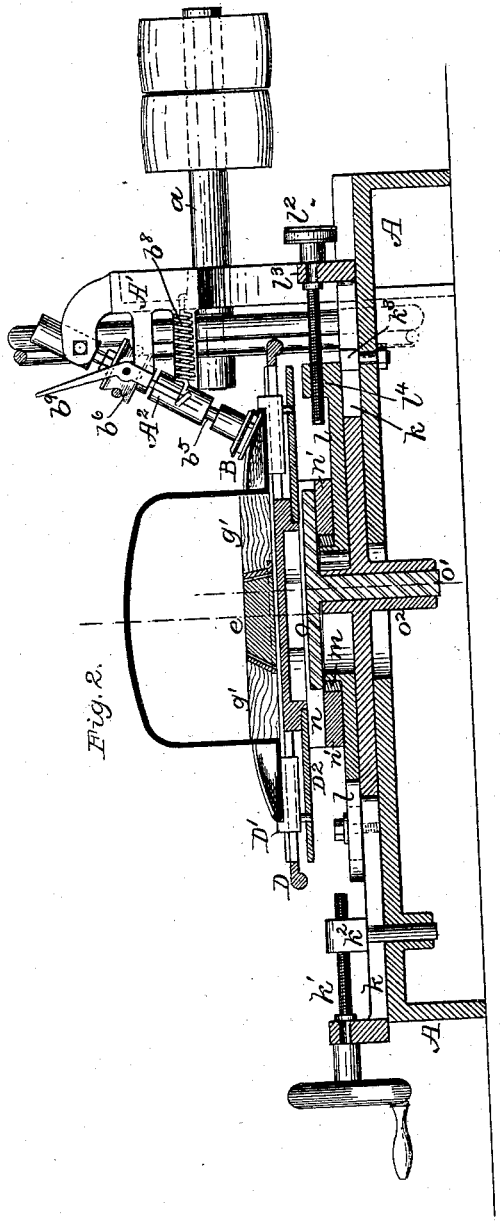
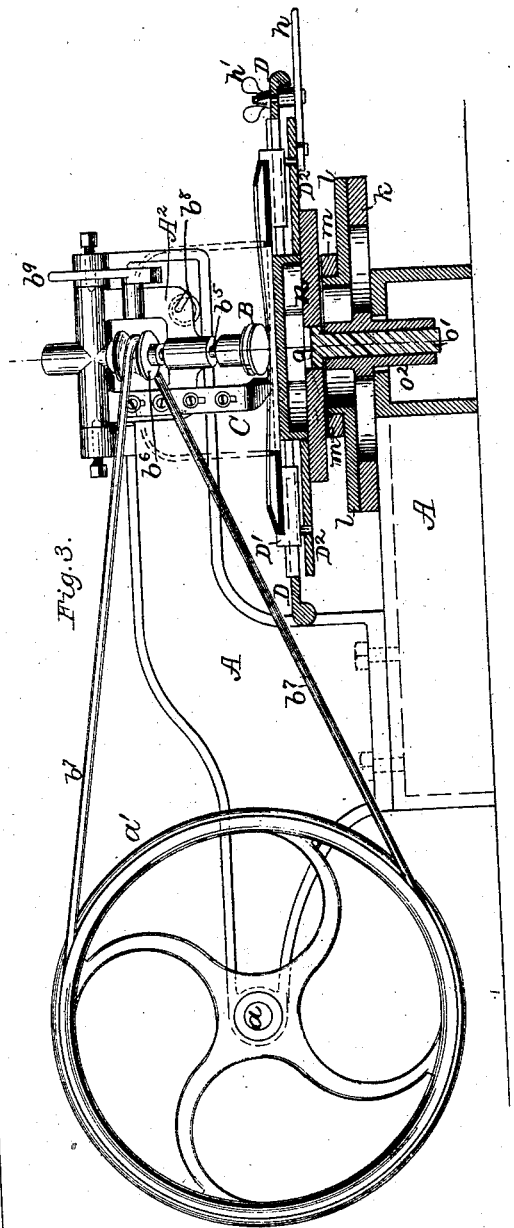
Attest:  
Philip F. Larner.  
Howell Battle
Inventor:  
Rudolf Eickemeyer  
By Wm. C. Wood  
Attorney.

(No Model.) 6 Sheets—Sheet 3.
R. EICKEMEYER.
MACHINE FOR PLANING THE FOLDED OR CURLED EDGES OF HAT BRIMS.
No. 317,324. Patented May 5, 1885.
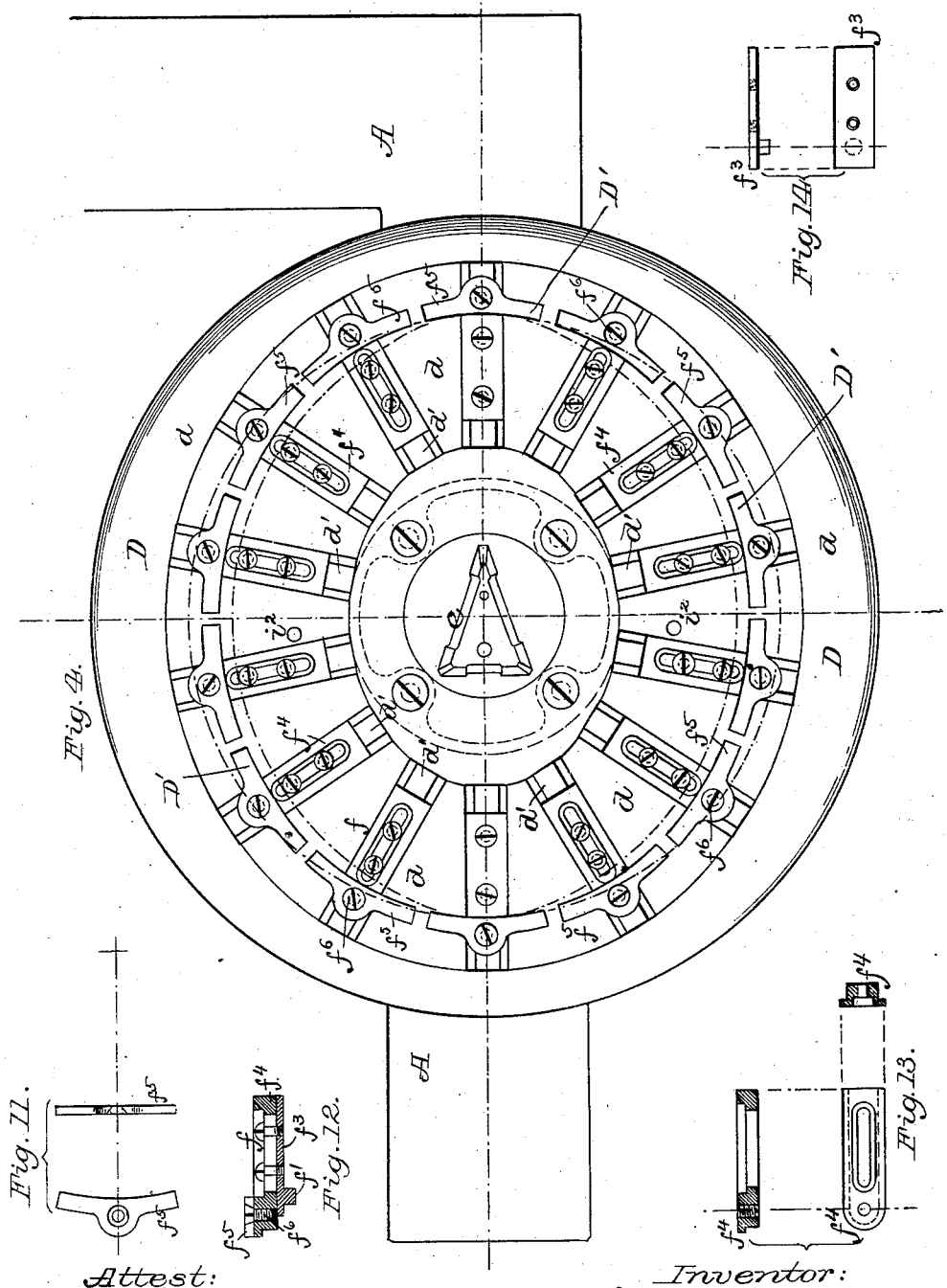

(No Model.) 6 Sheets—Sheet 4.
R. EICKEMEYER.
MACHINE FOR PLANING THE FOLDED OR CURLED EDGES OF HAT BRIMS.
No. 317,324. Patented May 5, 1885.
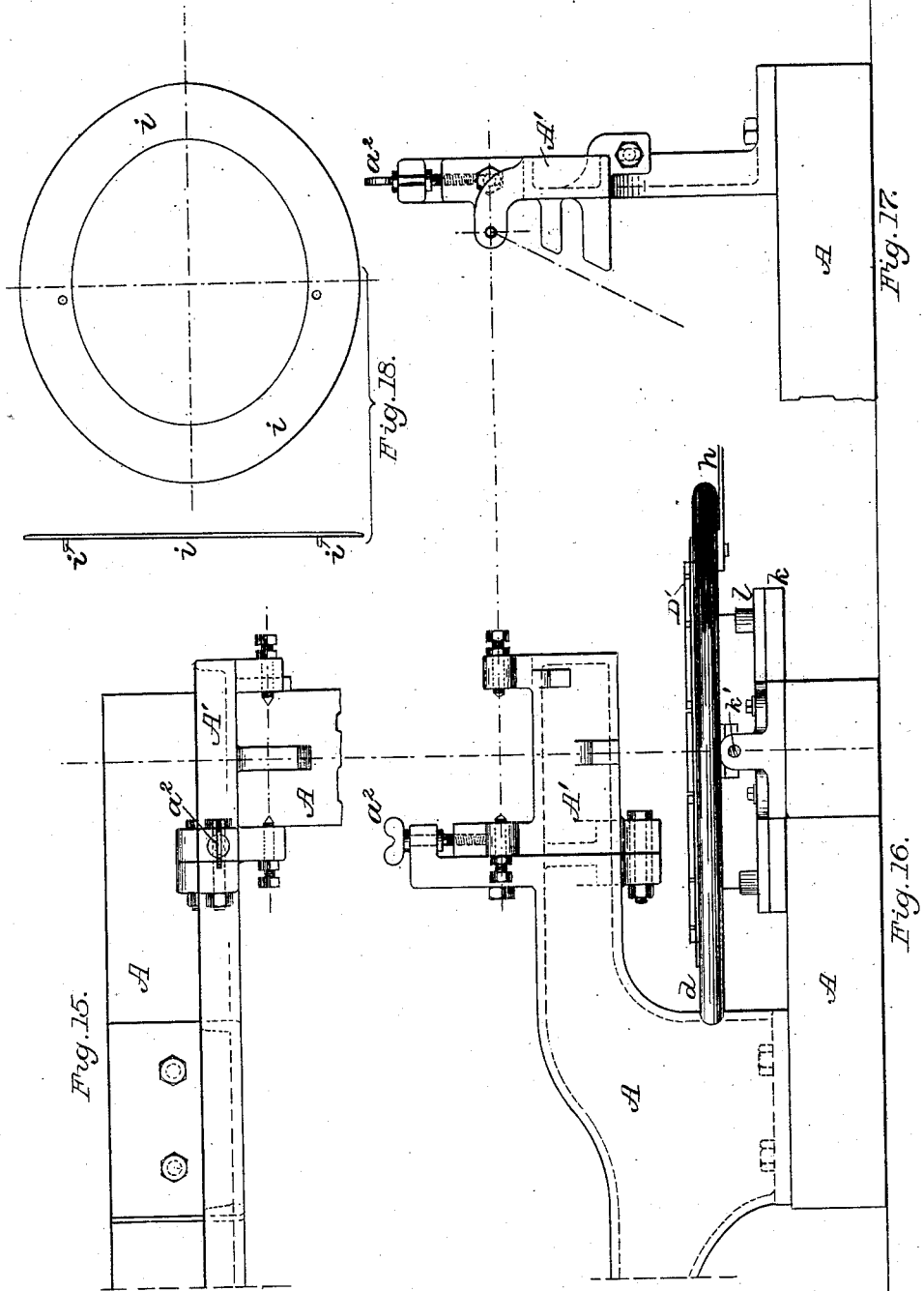

(No Model.) 6 Sheets—Sheet 5.
R. EICKEMEYER.
MACHINE FOR PLANING THE FOLDED OR CURLED EDGES OF HAT BRIMS
No. 317,324. Patented May 5, 1885.
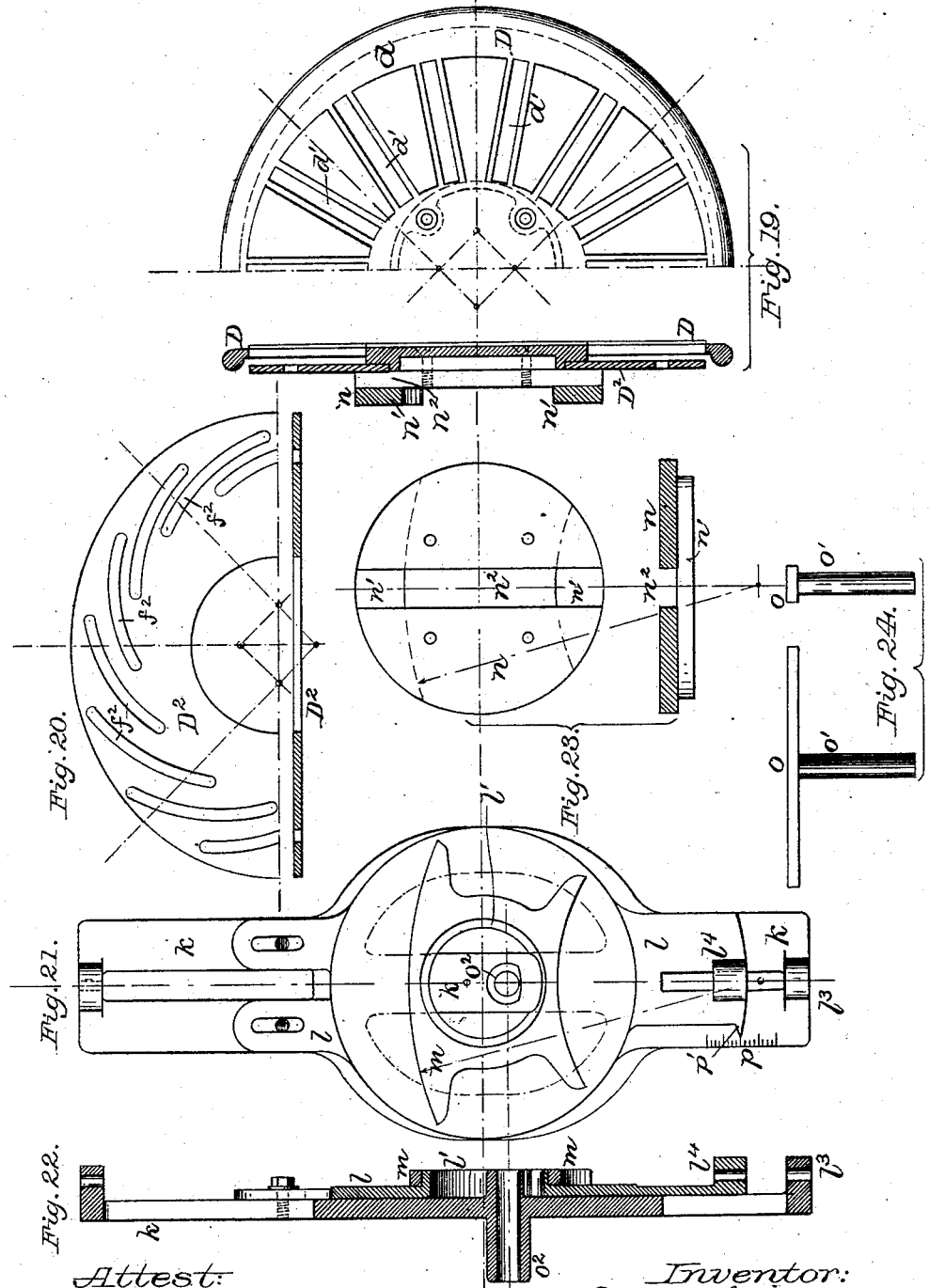

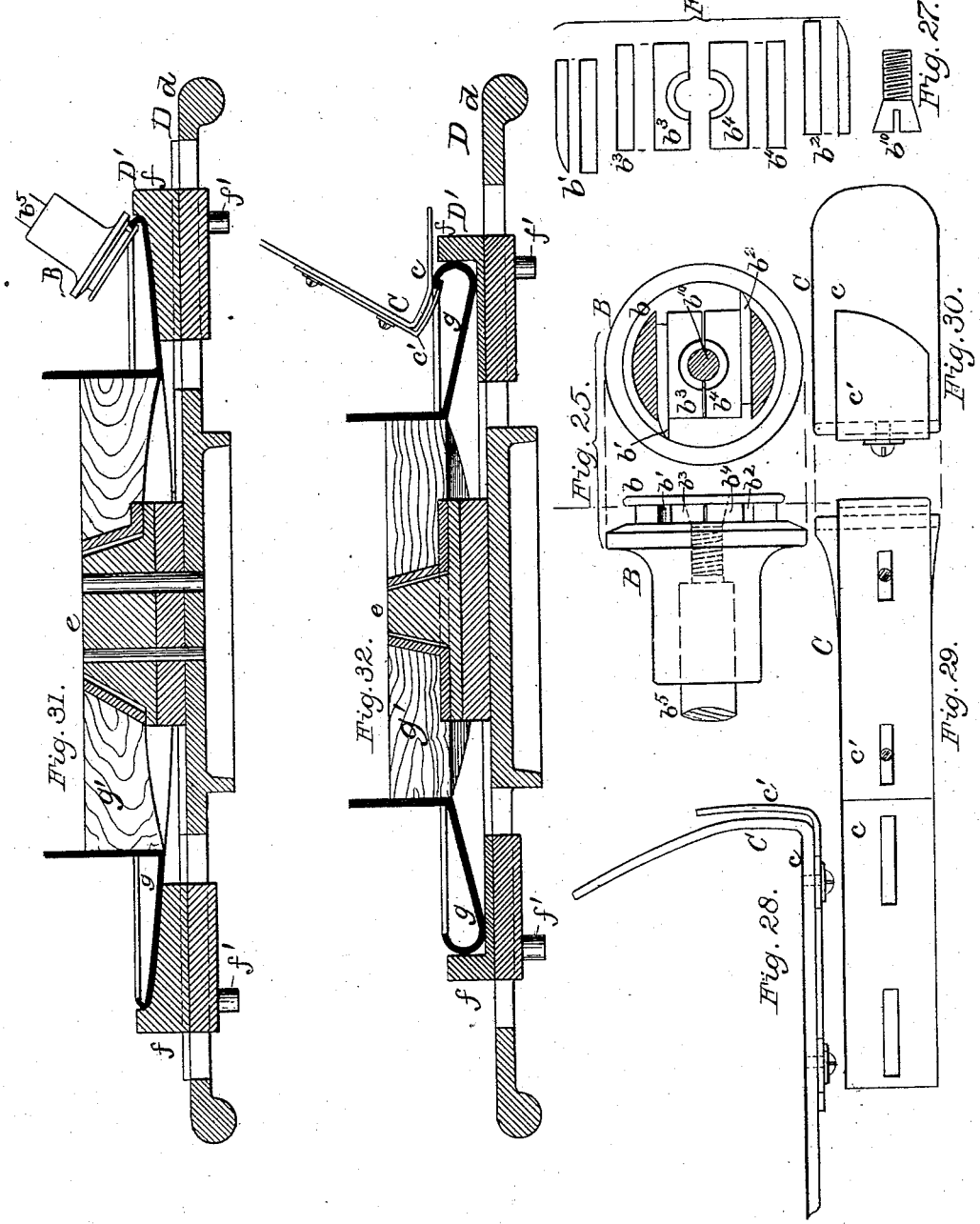

UNITED STATES PATENT OFFICE.

RUDOLF EICKEMEYER, OF YONKERS, NEW YORK.

MACHINE FOR PLANING THE FOLDED OR CURLED EDGES OF HAT-BRIMS.

SPECIFICATION forming part of Letters Patent No. 317,324, dated May 5, 1885.

Application filed January 15, 1885. (No model.)

*To all whom it may concern:*

Be it known that I, RUDOLF EICKEMEYER, of Yonkers, in the county of Westchester and State of New York, have invented a certain new and useful Machine for Planing the Folded or Curled Edges of Hat-Brims; and I do hereby declare that the following specification, taken in connection with the drawings furnished and forming a part of the same, is a clear, true, and complete description of the several features of my invention.

A machine embodying my present invention constitutes one of a series of machines which includes others which have been devised by me for folding and curling hat-brims under what I deem to be a novel system, and said machines have been made the subjects of separate applications for patent heretofore filed by me.

With one of my machines in its best form I am enabled, by merely turning a crank, to so trim a folded or curled brim-edge that it will be widest at its sides, and be gradually decreased in width toward front and rear until said folded or curled edge practically merges with the upper surface of the brim; but by variations in adjustment said machine will trim an edge which is folded entirely around the brim, either with uniformity in width or with any desired variations, because the cutting-line may be confined either to a true circle or to an ordinary oval, or to an "egg" or hat oval, regardless of the dimensions of said circle and ovals.

I employ as a novel feature in my machines a rapidly-driven rotary planing-tool provided with knives or cutters which remove the surplus felt in a finely-cut or "flocked" condition, as distinguished from removing said surplus in strips, as by rotary blade cutters, or rotary and vibrating shears, as used in brim-rounding machines, or as by knives which operate in making a "draw" cut on the felt, as in prior brim-planing machines. The rotary planing-tool as used by me can be relied upon for obtaining reliably uniform results, because it is not so liable to twist or warp a brim as when a cutter or blade is embraced between a strip of surplus felt and the trimmed edge; but it is to be understood that other forms of planing-tool may be employed without departure from certain features of my invention.

It is to be understood that various tools and organizations of mechanism have been heretofore devised for planing the edges of hat-brims, and that, after a full description of a machine as preferably constructed by me, and of such variations therein as I well know may be made with approximately desirable results, the features deemed novel will be specified in the several claims hereunto annexed.

Referring to the drawings, of which there are six sheets, Figure 1, Sheet 1, illustrates, mainly in plan view, a machine embodying such of the features of my invention as can be readily shown on so small a scale. Fig. 2, Sheet 2, is a vertical section of the machine on line $x$, Fig. 1. Fig. 3, Sheet 2, is a vertical section of the same on line $y$, Fig. 1. Fig. 4, Sheet 3, is an enlarged view of the hat-support of the machine. Figs. 5 to 10, inclusive, Sheet 1, and 11 to 14, inclusive, Sheet 3, illustrate in detail two forms of sections employed by me in an adjustable brim-clamping ring, which is mounted on the hat-bed. Figs. 15, 16, and 17, Sheet 4, illustrate in plan, side, and end views certain portions of the machine for exhibiting details in the construction of the portions of the frame in which the planing-tool is mounted. Fig. 18, Sheet 4, illustrates in plan and edge view a guide-plate such as is used in another of the series of machines devised by me and hereinbefore referred to, said plate being employed in this machine only for the purpose of adjusting a brim-clamping ring to operate upon hats having a corresponding contour of brim. Fig. 19, Sheet 5, illustrates in half plan and in diametrical section the hat-bed and a portion of the underlying mechanism. Fig. 20, Sheet 5, illustrates in half plan and in diametrical section a rotative slotted plate, by which the brim-clamping ring-sections are simultaneously moved toward and from the center of the hat-bed. Figs. 21 and 22 are respectively a plan and a longitudinal vertical section of the oval chuck on which the hat-bed is mounted. Fig. 23, Sheet 5, illustrates in plan and diametrical section a peculiar circular slotted plate, by which the hat-bed is coupled to the oval chuck, of which latter it also forms a part. Fig. 24 illustrates in side and end views a pivotal cross-head, the head of which occupies a transverse slot in the plate, Fig. 23. Fig. 25, Sheet 6, illustrates a rotary planing-tool in what I deem its best form, the same being in side view and in section. Fig. 26, in two views each, illustrates two cutters and their two clamping-blocks detached from the head of the planing-tool. Fig. 27 is a side view of a central clamping-screw, by which the cutters are properly confined in the rotary planing-tool. Figs. 28, 29, and 30 illustrate, respectively in edge, top, and end views, a brim-edge supporter, by which the edge of a brim is properly lifted and held during the action of the rotary planing-tool thereon. Figs. 31 and 32, respectively, illustrate the positions respectively occupied by the ends and sides of a brim rounded at its sides when presented to the action of the planing-tool.

The frame A of the machine in plan is L-shaped, as indicated in Fig. 1, and is provided at the rear end of a vertical bracket on one of its arms with a driving-shaft, $a$, provided with suitable tight and loose belt-pulleys and with a grooved balance and belt wheel, $a'$. At the junction of the arms of the frame (best and fully shown in Figs. 15 to 17, inclusive, Sheet 4) there is a vertically-sliding frame, A', to which a thumb-screw, $a^2$, is tapped, whereby the sliding frame may be vertically adjusted and then firmly secured in position by the set-bolts and elongated bolt-holes, as clearly shown, all in a well-known manner.

Figs. 1, 2, and 3 being complex and on a small scale, the details of the vertically-sliding frame A' could not therein be very plainly illustrated, and hence reference should be had to Figs. 15 to 17, Sheet 4. It is, however, to be understood that fairly-desirable results will accrue if the swinging frame A², to be hereinafter more fully described, be mounted directly upon the vertical portion of the frame.

The planing-tool B is in the form of a rotary cutter-head, (illustrated in detail on Sheet 6, Figs. 25 and 26,) wherein $b$ indicates the cutter-head transversely slotted for the endwise reception of two knives or blades, $b'$ $b^2$, having their cutting-edges oppositely located, and two wedge-blocks, $b^3$ $b^4$, which are forced apart for clamping said blades against their respective sides of the slot in the head by the central clamp-screw, $b^{10}$, having a conical head, which serves as a wedge in the conical seat between the two wedge-blocks $b^3$ and $b^4$. The cutter-head is mounted upon the lower end of an inclined shaft, $b^5$, having its bearings in a swinging frame, A², which is pivoted at its upper end to the vertically-adjustable frame A'. The cutter-shaft $b^5$ has thereon a small grooved pulley, $b^6$, which is coupled by a round belt or cord, $b^7$, to the grooved balance-wheel $a'$.

A contractile spring, $b^8$, secured at one end to the frame A' and at its other end to the frame A², firmly maintains the latter frame at such an angle as will enable the cutter to properly operate upon the edge of a folded or curled brim, and a lever, $b^9$, pivoted on said frame A², by being deflected, swings the latter away from the frame A', and thus enables the planing-tool to be swung outwardly and held from its proper working position. The vertical adjustability of the frame A' obviously enables the planing-tool to be adjusted to any desired height.

For obtaining good results it is important that the folded portion of the brim to be acted upon by the planing-tool should be maintained in a plane practically at right angles to the axis of the planing-tool, and that the edge to be cut should be in a plane common to that of the cutters, and therefore I have devised an edge-supporter, C, well illustrated in Figs. 3, Sheet 2, and 28, 29, 30, and 32, Sheet 6. This edge-supporter is composed of two bent plates of metal, one of which, $c$, is the main plate, which is secured by slots and bolts to the outer surface of the swinging frame A², so as to occupy an inclined position and to present its lower or bent end partially horizontal and partially inclined upwardly, as clearly indicated. The other plate, $c'$, is also bent at its lower end, and is secured to the top of the main plate by bolts and slots, so that the space between the two plates at their lower ends can be graduated for properly receiving and securely confining brim-edges of various thicknesses against vertical vibration. The adjustability of the edge-supporter upon the frame A² enables said support to be accurately adjusted with relation to the planing-tool and in the same plane, and both of them are capable of simultaneous vertical adjustment by means of the thumb-screw $a^2$, Figs. 15 to 17, inclusive. The edge-supporter should be located as nearly as practicable to the cutting-surface of the planing-tool, and in some cases—as with a very wide fold at the edge of a brim—it will be advisable to employ a second edge-supporter on the opposite side of the planing-tool for more securely holding the folded felt against all vertical or other displacement. In this connection I desire to be understood that although I believe I am the first to organize a rotary planing-tool in a machine for trimming the folded edges of hat-brims, I do not preclude myself from employing other types of cutter in connection with certain other features of my invention, as I am well aware that certain portions of my invention can be employed with good results, regardless of the particular construction of the planing-tool.

It is to be observed that in mounting my planing-tool I have provided for such various complex movements of said tool as would enable it to operate at various points in different vertical and horizontal planes, and it is obvious that by variably controlling said tool it would properly operate upon all portions of the edge of a folded or curled brim; but I deem it preferable to permit said tool after adjustment to operate in a fixed position, and therefore I have so organized my machine that a hat-brim will be variably presented to the planing-tool, and thereby provide for variations in the cutting-line. For thus presenting the brim to the planing-tool it is essential that the hat shall be supported by or mounted upon a bed controlled by an oval chuck provided with means for receiving and properly centering a hat or a hat-block of some kind, and arranged with relation to the planing-tool so that the latter will be located opposite the non-variable path of the chuck. This oval chuck may be of the ordinary well-known type without departure from certain features of my invention; but I employ an oval chuck as devised by me for developing "egg-shaped" or hat ovals, thus enabling the cutting-lines to correspond in shape or outline with the proper oval outline of the crown of a hat.

The rotative hat-bed D will be first described independently of the oval chuck mechanism, and in connection with the several figures on Sheets 1 and 3, and Figs. 19 and 20, Sheet 5. Said bed has a cap-plate, $d$, on which a hat-block chuck, $e$, of peculiar form is mounted, and adapted to receive any block provided with a socket corresponding thereto in form in such a manner that a hat on said block will always be properly mounted and centered on the hat-bed. This block-chuck was devised by me, and constitutes the subject of a separate application for Letters Patent. It is not absolutely essential that a block be employed for thus centering a hat, in view of the value of an expansible brim-clamping ring, to be hereinafter described, which in itself operates as an effective hat-centering device, although the brow-block chuck $e$ greatly contributes to the convenient and accurate operation of the machine.

Inasmuch as in other of the new machines in the series of machines hereinbefore referred to as having been devised by me a brow-block or hat-block of some kind is preferably employed, it is advisable that this machine be provided with the same kind of block-chuck as said other machines, so that a hat while still on the block may be readily mounted upon the hat-bed, although an expansible hat-block may be used, if desired. The cap-plate $d$ of the hat-bed is annular in form, has a rounded flange at its periphery, and is provided with a series of slots, $d'$, radiating in proper order, as from four centrally-located points, which constitute the axes of the oval. Upon said cap-plate an expansible brim-clamping ring, D', is mounted, which is composed of a series of sections each mounted in its proper radial slot, $d'$, and a rotative cam-plate, $D^2$, beneath said bed-plate, coupled to all of said sections in such a manner that they are not only maintained in their proper working positions, but so that they can be simultaneously adjusted or varied in position, and thereby enlarge or diminish the size of the brim-clamping ring.

Clamping-ring sections are illustrated by me which are adapted for use in a brim-clamping ring capable of receiving and peripherally clamping brims of all sizes, provided the form of the oval is not varied, and others are also shown which can be used in like manner, regardless of variations in the form of the oval.

As seen in Figs. 5 to 10, Sheet 1, the brim-ring sections $f$ are constructed in one piece, and are provided with a pendent stud, $f'$, on their lower sides, so that when occupying their respective slots $d'$ in the cap-plate $d$ said studs will occupy their respective curved cam-slots $f^2$ in the underlying cam-plate $D^2$, so that when the latter is partially rotated to and fro said sections will be simultaneously and with uniformity moved radially in their slots, all of which will be readily understood on reference to Figs. 1, 2, 3, 20, and 21. As the operation of the cam-plate $D^2$ is unvariable, it follows that the sections must be adjustable with relation to said plate, in order to vary the outline character of the oval brim-ring, and therefore said sections $f$ are constructed by me in several pieces, as illustrated in detail on Sheet 3, Figs. 11 to 14, inclusive. The same stud $f'$ is employed; but it is formed upon a base, $f^3$, provided with tapped holes for the reception of clamp-screws, by which a slotted intermediate block, $f^4$, can be adjusted longitudinally with reference to said stud and then clamped to the base $f^3$. At the outer end of each section there is a curved head-bar, $f^5$; but instead of being integral with the base, as in Figs. 5 to 10, inclusive, it is a separate piece, and is swiveled upon the block $f^4$ by a pivot-screw, $f^6$. With this construction it will be seen that although the studs $f'$ and the cam-plate $D^2$ are never varied in their relative positions, the head-bars $f^5$ can be advanced or retired, and thus vary the form of the oval, and that the swiveling of the head-bars enables them to readily conform to such variations in outline as would result from a change in the form of oval. The sections $f$ at the two opposite ends of the brim-ring obviously need not be thus susceptible of adjustment, although it is generally desirable that they should have the pivoted head-bars.

Whether the brim-ring sections $f$ be simple or complex in their construction, the surfaces thereof inside of the head-bars (with which the under side of a hat-brim is in contact) are varied in contour according to the style of folded brim to be planed, as can be best described in connection with Figs. 31 and 32, Sheet 6, the sections $f$ there shown being of the simple variety.

It is to be understood that the tops of the several head-bars or outer ends of the sections occupy the same plane, but that their height or thickness on their inner sides or faces is varied—as, for instance, those at the ends of the brim-ring have a height but little greater than the thickness of the folded edge of the brim at the front and rear of the hat, and the surfaces thereof on which the brim is supported are inclined downwardly toward the center of the cap-plate, as seen in Fig. 31—while the sections for the sides of the hat-brim have head-bars which are a little thicker than the height of the rounded curl of the hat-brim when in the position as seen in Fig. 32, and it is to be understood that the intervening sections have brim-supporting surfaces which enable a hat-brim, $g$, to be properly mounted thereon, and to present its folded edge practically in a horizontal plane, the ends of the brim being inclined slightly upward, as in Fig. 31, (instead of downwardly, as in a finished hat,) and the main or inner portion of the brim at the sides being inclined downwardly, as in Fig. 32.

With this construction and organization of the parts described it will be seen that the planing-tool can readily be made to cut the folded edge, practically, all away at the front and rear ends of a brim, or, in other words, to trim a folded edge of any desired width at the sides of a hat, and to gradually decrease its width in both directions toward front and rear until said edge practically merges with the upper surface of the brim at or near each end thereof. If flat sharply-folded edges of brims are to be planed, the sections $f$ of the brim-ring should be substantially as shown in Figs. 5, 6, and 7—i. e., with the head-bar but little higher than twice the thickness of the brim. In some cases it is desirable that the head-bars of the clamping-ring sections $f$ be undercut or recessed on their inner faces, so as to not only confine the brim peripherally, but also against any lifting movements.

It will be readily seen that if the cam-plate $D^2$ be rotated by means of its handle $h$ any-sized hat-brim can be readily provided with its proper seat on the brim-clamping ring, because of the simultaneous and uniform radial movement of the several sections $f$, and for locking said cam-plate in its adjusted position it is provided with a thumb-screw, $h'$, which occupies a curved slot, $h^2$, in the bed-plate $e$, as clearly shown in Fig. 1.

For accurately changing the form of the brim-ring, I employ a brim-folding guide-ring as a pattern-plate, said guide-ring being one also employed in a brim folding or curling machine devised by me, and as the very hats to be trimmed will usually have been previously operated upon by a machine having a guide-ring of proper form, said guide-ring can always be relied upon as a gage for shaping the brim-ring. Such a guide-ring or pattern-plate is shown at $i$, Fig. 18, Sheet 4, and it is provided with irregularly-located pins $i'$, which occupy holes $i^2$ in the bed-plate $d$. (Shown on an enlarged scale in Fig. 4, Sheet 3.) With this pattern-plate $i$ in position on the bed-plate $d$, and all of the complex sections $f$ loosened, as between their bases $f^3$ and blocks $f^4$, it will be seen after the two end sections have been placed in contact with the pattern-plate by rotating the cam-plate, and after the latter is locked in position, that all of the complex sections can then be freely moved for placing their head-bars $f^5$ against said guide-plate, whereupon the guide-plate is removed and the clamping-screws of the several sections are tightened, thus affording a brim-ring corresponding exactly with the outline of the guide-plate.

As hereinbefore indicated, the hat-supporting bed D may be mounted upon any variety of oval chuck without departure from certain portions of my invention; but it is essential that said chuck and the hat-bed be capable of bodily adjustment—i. e., as a whole they must be capable of movement toward and from the planing-tool. This is accomplished by mounting the chuck and hat-support upon a sliding plate, $k$, resting flatly on one arm of the main frame A, and providing the same at its outer end with a rotative crank-screw, $k'$, housed in a bracket on said plate and tapped into a stationary nut, $k^2$, on a stud projecting upward from the main frame through a slot in the sliding plate $k$, as clearly indicated at the left-hand portion of Fig. 2, Sheet 2. The opposite end of the sliding plate is also slotted for the reception of a square guiding-stud, $k^3$, for securing a straight-line movement of said plate.

Referring now to Figs. 21 to 24, inclusive, Sheet 5, I will describe the oval-chuck mechanism, which, broadly considered, is similar to that described in my oval-lathe patent of April 5, 1870, hereinbefore referred to; but the mechanism here shown has been specially devised and organized for use in this particular connection.

In Figs. 21 and 22 the sliding plate $k$, before described, is clearly shown, and on top of that will be seen a sliding hub-plate, $l$, having a circular hub, $l'$, extended upwardly for the reception of the cross-head $m$, which has two curved sides—one convex and the other concave—and upon said cross-head there is mounted the circular plate $n$, on and to which the overlying portions of the hat-bed are mounted and secured. The circular plate $n$ has on its under side two plates, $n'$, one of which has a concave edge and the other a convex edge, respectively fitted to the two curved sides of the cross-head $m$. Said circular plate is diametrically slotted at $n^2$ above the plates $n'$, for the reception of the head of a second cross-head, $o$, Fig. 24, which has a round spindle or stem, $o'$, freely housed in a tubular bearing, $o^2$, in the sliding plate $k$, said bearing being eccentrically located in the circular hub $l'$ on the hub-plate $l$. The co-operation of these two cross-heads during the rotation of the circular plate $n$ with the hat-support imparts to the latter the desired "egg" or hat oval movement.

For varying the eccentricity of the oval line developed it is obviously only necessary to vary the relative positions of the two cross-heads, and this is accomplished by moving the hub-plate $l$ longitudinally upon the sliding plate $k$, and therefore I have provided an adjusting-screw, $l^2$. (Shown clearly in Fig. 2, at the left-hand portion thereof.) Said screw is rotatively housed in an ear, $l^3$, projecting upwardly from the plate $k$ and tapped into a corresponding ear, $l^4$, on the hub-plate.

For readily adjusting the chuck to any desired degree of eccentricity, I have provided a scale at *p* on top of the sliding plate *k*, and a pointer, *p'*, on the hub-plate, as clearly shown in Fig. 21, Sheet 5.

In view of the foregoing description the operation of the machine will be readily understood to be as follows: It will be assumed, for instance, that a folded or curled brim is to be planed, so that the folded edge at front and rear is to be but one-eighth of an inch wide, but at the sides one-half inch wide. In this case the hub-plate *l* is adjusted by means of the screw *l²* and the scale *p*, so as to develop an oval of two and one-fourth inches eccentricity. The planing-tool is tilted upwardly by means of its lever *b⁹*, and held in that position. The brim-clamping ring is properly expanded. The hat on a brow-block, *g'*, is then centered on the hat-support and the brim-clamping ring contracted until it properly engages with the periphery of the brim, whereupon it is secured by the thumb-screw *h'*. The crank-screw *k'* is then turned for carrying the periphery of the hat-brim beyond and to the rear of and below the operative position of the planing-tool, which is then lowered, and, if not already in motion, power is applied thereto. The inwardly-folded edge of the brim is then properly entered between the two plates of the edge-supporter C, and the crank-screw *k'* so turned as to properly present the felt to the planing-tool, after which the hat-support is slowly rotated, thus enabling the planing-tool to act upon the entire edge of the felt, and to trim or plane it to the exact oval outline desired.

If a round brim having a folded edge were to be trimmed to a uniform width, it will be seen that by adjusting the hub-plate by means of the adjusting-screw *l²* so that its circular hub would be concentric with the spindle of the straight cross-head *o*, the hat-support will describe a truly circular line, and the planing-tool would of necessity leave a folded edge of uniform width, thus indicating the wide range in the capacity of this machine.

While I prefer the rotary planing-tool to any other, and believe I am the first to organize such a tool as to enable it to operate on the folded or curled edges of hat-brims, I am aware that approximately desirable results will accrue if a thin sharp stationary cutting-blade be employed in lieu of my rotary cutters, and such a blade, as a substitute for the rotary planer or cutter, can be employed without departure from certain portions of my invention. I also prefer that the hat-brim be progressively presented to the action of the planing-tool; but it will be obvious to persons skilled in the art that my hat-bed, with its expansible brim-clamp, need not be rotative, as shown, but can be fixed, and that oval-chuck mechanism can be made to guide the planing-tool in oval lines, in which case it would be only necessary to suspend said chuck from an overhanging bracket-frame, couple the planing-tool thereto in an inwardly-inclined position, and drive it from a central drum or pulley, the belt being provided with a spring-tightener in a manner well known. In this connection it is to be understood that I do not limit myself to the employment with my rotary planing-tool of a rotative hat-bed controlled by an oval chuck, nor to said planing-tool controlled by an oval chuck, because it is obvious that the hat-bed can be simply rotated upon a central spindle, and the rotary planing-tool caused to swing or move toward and from the center of the bed and over a portion of it, for varying the line of cut by means of a pattern-block corresponding in contour to the line of cut desired, the frame in which the planing-tool is mounted being in such case moved by the pattern-block in a manner similar to that heretofore employed by me in hat-block lathes, as shown and described in my Letters Patent No. 236,422, dated January 11, 1881.

Having thus described my invention, I claim as new and desire to secure by Letters Patent—

1. The combination, substantially as hereinbefore described, of the rotary brim-planing tool, adapted to plane the folded edge of a hat-brim, and a hat-bed.

2. In a hat-brim-planing machine, the combination, substantially as hereinbefore described, of a planing-tool, adapted to cut the edge of a folded brim, and a rotative hat-bed mounted upon and controlled by an oval chuck, substantially as hereinbefore described.

3. In a hat-brim-planing machine, the combination, substantially as hereinbefore described, of a planing-tool adapted to cut the edge of a folded brim, a hat-bed, and an oval chuck organized to develop egg-shaped or hat ovals, as set forth.

4. In a hat-brim-planing machine, the combination, with a planing-tool, of a rotative hat-bed mounted upon and controlled by an adjustable oval chuck, whereby the oval cutting-line of the planing-tool can be developed in various elliptical forms.

5. In a hat-brim-planing machine, the combination, substantially as hereinbefore described, of a planing-tool, a hat-bed, and a brim-clamp mounted on said bed, for clamping the brim peripherally.

6. In a machine for planing or trimming the folded edge of a hat, the cutting-tool, a centering hat-block to locate the hat upon the bed, and the brim-edge-clamping devices, substantially as described.

7. In a hat-brim-planing machine, the combination, substantially as described, of a planing-tool, a hat-bed, and an adjustable brim-clamp, whereby brims of various sizes may be clamped peripherally for planing.

8. The combination, with the hat-bed, of the brim-clamping ring adjustable to various sizes of ovals, and also adjustable as to oval outlines of varied eccentricity, substantially as described.

9. The combination, substantially as hereinbefore described, of the rotary brim-planing tool, the rotative hat-bed, and a brim-clamping ring.

10. The combination, substantially as hereinbefore described, of the rotary brim-planing tool, the rotative hat-bed, and an adjustable brim-clamping ring for engaging with brims of various sizes.

11. The combination, substantially as hereinbefore described, of the rotary brim-planing tool, the hat-bed, and the oval brim-clamping ring, adjustable both as to size and also as to form of oval outline.

12. The combination, substantially as hereinbefore described, of the hat-bed and the brim-clamping ring embodying end sections having head-bars which are thicker at the sides of the ring than at the ends thereof, for enabling the folded edge of a brim rounded at its sides to be presented substantially in a horizontal plane to the planing-tool.

13. The combination of the rotative hat-bed and the rotary planing-tool mounted upon a swinging frame, substantially as described.

14. The combination of the rotative hat-bed and the rotary planing-tool mounted upon a vertically-adjustable swinging frame, substantially as described.

15. The combination, with a rotary brim-planing tool, of a brim-edge supporter, which confines the edge of the brim against vibration during the operation of the planing-tool, substantially as described.

16. The combination, with the rotary planing-tool mounted upon a movable frame, of the brim-edge supporter vertically adjustable on said frame, whereby the planing-tool and edge-supporter may be accurately located with reference to a common plane, substantially as described.

17. The combination, with the hat-brim-planing tool, of the brim-edge supporter composed of coincident plates adjustable with reference to each other, for affording a variable intervening edge-receiving space adapted to the thickness of a hat-brim at its edge, substantially as described.

18. The combination of the hat-bed, the swinging frame on which the planing-tool is mounted, and the lever by which said frame is swung outwardly and held for permitting the hat-bed to be properly located with a hat thereon beneath said planing-tool preparatory to the planing operation, substantially as described.

RUDOLF EICKEMEYER.

Witnesses:
WM. B. EDGAR,
JAMES S. FITCH.